United States Patent [19]

Roche

[11] 3,928,727

[45] Dec. 23, 1975

[54] SYNCHRONIZATION DEVICE FOR TIME-MULTIPLEXED SIGNAL TRANSMISSION AND SWITCHING SYSTEMS

[76] Inventor: Alain Y. Roche, 41 rue du Sergent L'Heveder, 22700 Perros-Guirec, France

[22] Filed: Dec. 23, 1974

[21] Appl. No.: 535,584

[52] U.S. Cl....... 179/15 BS; 179/15 AF; 178/69.5 R

[51] Int. Cl.[2] ............................................. H04J 3/06

[58] Field of Search.................... 179/15 BS, 15 AF; 178/69.5 R

[56] References Cited

UNITED STATES PATENTS 3,662,114 5/1972 Clark.............................. 179/15 BS 3,813,496 5/1974 Maillet........................... 179/15 BS

*Primary Examiner*—Ralph D. Blakeslee

*Attorney, Agent, or Firm*—Abraham A. Saffitz

[57] ABSTRACT

Device for synchronizing an incoming digital signal comprising time-slots containing pulse code modulation signals multiplexed in frames. Means are provided for defining (i) a distant clock timing pulse having a fixed position relative to the incoming signal frame, (ii) a first and a second local clock timing pulses having a fixed position relative to the outgoing signal frame and (iii) a first and a second time-windows overlapping said two local clock timing pulses. The coincidence of the distant clock timing pulse with the first and the second time windows is detected and accordingly an instant for writing the PCM signals in a frame memory is selected, this writing instant being the first or the second local clock timing pulse. The instant for switching the writing instant from a local clock timing pulse to the other is selected differently when the two writing instants to be switched to one another are in the same time slot or not.

3 Claims, 8 Drawing Figures

SYNCHRONIZATION DEVICE FOR TIME-MULTIPLEXED SIGNAL TRANSMISSION AND SWITCHING SYSTEMS

The present invention generally concerns digital switching systems for serial binary data information in the form of time-multiplexed pulse code modulation signals, and more particularly a system of resynchronization of the frame of the time multiplexed signals due to slight time shifts between the clocks of the switching networks.

It is known that, in digital data transmission systems, a plurality of analog signals are converted into pulse code modulation signals and that these PCM signals are time multiplexed within frames. The resulting time-multiplexed signal is transmitted on a digital transmission channel between time division switching networks. In order to fix the ideas and without reducing the field covered by the invention, it will be advisable in the continuation of the present specification to consider a conventional system of transmission of multiplexed PCM signals with a frame of 125 microseconds comprising 32 time slots each having a duration of 3.9 microseconds. The time slots of a frame are numbered from $t_0$ to $t_{31}$ and are respectively assigned to channels 1 to 31. Each time slot is divided into 8 bit time intervals each having a duration of 500 nanoseconds and numbered from $\omega_0$ to $\omega_7$. The eight bits in a time slot form an octet.

It will be assumed that the time slot $t_i$ and the bit time interval $\omega_k$ are determined by clocks located in each of the switching networks and which are not exactly synchronous with each other and that each switching operation necessitates a change of clock before processing and retransmission of the digital data. There follows a time shift pnenomenon which gives rise to two different results according as to whether the local clock is slower or quicker than the distant clock by which the incoming signals have been timed. If the local clock is slower than the distant one all the octets transmitted will not be re-transmitted, and it will be necessary therefore from time to time to renounce transmitting an octet; that is an octet omission. If, on the other hand, the local clock is quicker than the distant one, one will have to transmit more octets than are received. From time to time one will have to transmit twice the same octet; that is an octet duplication.

There will be called indifferently in the continuation "octet jump" an octet omission or an octet duplication when it is not necessary to make the distinction. The omission or the duplication of an octet corresponds to a deterioration of the information at the receiving end of the transmission channel. In the case of two clocks, the relative frequency precision of which is $10^{-6}$ which corresponds to the standards of the European Conference of Post and Telecommunications (C.E.P.T.) a transmission channel will undergo a loss of information every 125 $\mu$s of time shift (125 $\mu$s separating two octets from the same channel) that is to say every 125 $\mu s/10^{-6}$ = 125 seconds which is inadmissible in digital information transmission.

One is therefore led, in order to obviate this drawback, to insert in the transmission channels between the significant octets, octets empty of information which are not treated at the ends of the transmission channel. These octets are recognizable from others for example by the value of one binary element; it is obvious that the octets may undergo omissions or duplications without there resulting a loss of information. They are called stuffing octets.

The object of the present invention is to subject a change of clock to a time multiplexed PCM signal by taking care that only the stuffing octets are subjected to the necessary jump pointed out above.

In the conventional multiplex digital transmission systems adopted for the explanation of the system of resynchronization which is the object of the invention, without prejudicing its generalization in similar systems, it is admitted that:

the channel No. 0 corresponding to time slot $t_0$ is not used for the transmission of digital data, but serves as a frame reference for the resynchronization of the multiplex. The information which it contains has not to pass through the switching network and must be lost at the level of the resynchronization system;

the 31 following channels corresponding to time slots $t_1$ to $t_{31}$ each convey digital data at a rate of 64 kilobits per second (kb/sec);

the identification of the stuffing octets will be made by the first bit of the octet; if the first bit of the octet is a one, the octet contains an information; if on the contrary it is a zero, it is a stuffing octet;

in the system of the invention, the location of the stuffing octets are independent from one channel to the other, and in particular are not in the same frames, which is of great importance as will be seen in the course of the explanation;

at the input of the system of resynchronization of a digital switching network, the incoming signal comprises the multiplex digital signal at 2.048 Megabits/-second (Mb/sec) and timing pulses $\omega^*$ which have been reconstituted by a distant clock reconstitution device which is known in the art;

at the output of the system, the multiplexed signal is timed by the timing pulses $\omega$ of the local clock.

In the following, the timing pulses of the distant clock are noted $\omega^*$ with an asterisk and the timing pulses of the local clock are noted $\omega$.

In the conventional multiplex pulse code modulation systems, the resynchronization of the frame with the local clock of the arrival switching network is effected by a synchronization device comprising a buffer memory inserted between an input register and an output register, means for transferring the incoming octets from the input register to the buffer memory at the rate of the distant clock and means for transferring the octets stored in the buffer memory to the output register at the rate of the local clock. These latter transfer means are controlled by a transfer control circuit which decides the transfer at a first transfer instant or at a second transfer instant located within the local time slot corresponding to the channel to which the octet to be transferred belongs according as to whether an instant connected to the distant clock is comprised in a first window or in a second window of the said local time slot.

The switching of the first instant of transfer to the second instant of transfer, or vice versa, is effected during the time slot following that during which the instant connected to the distant clock enters or leaves the windows. Now, when the transfer has to be switched from a first instant of transfer to a second instant of transfer, which is later but is located in the same time slot, the fact of effecting the switching of the instant of transfer only during the following time slot causes a jump (omission or duplication) in writing-in.

According to the invention, this jump in writing is avoided owing to means permitting the selection of the instant of switching between the first instant of transfer and the second instant of transfer from the buffer register to the frame memory. This instant of switching is located in the time slot following that in the course of which the coincidence between the instant connected to the distant clock and the windows connected to the local clock is detected except when the switching has to take place between a first instant of transfer and a second subsequent instant of transfer, both located in the same time slot in which case, the instant of switching is selected between these two instants of transfer.

According to another feature of the invention, the switching between the first instant of transfer and the second instant of transfer is conditioned by the fact that the octet occupying the interval of time during which the coincidence between the instant connected to the distant clock and one of the windows connected to the local clock is detected, is a stuffing octet. In other words, a jump of time slot is only authorized when the time slot contains a stuffing octet.

According to another feature of the invention, any complete jump of frame is avoided by writing the octets of the time slots and reading them according to a writing-in address sequence and a reading-out address sequence having at the most, when one sequence is displaced in respect of the other, two coincidences.

The invention will be described in detail with regard to the attached drawings in which.

Figure 1:
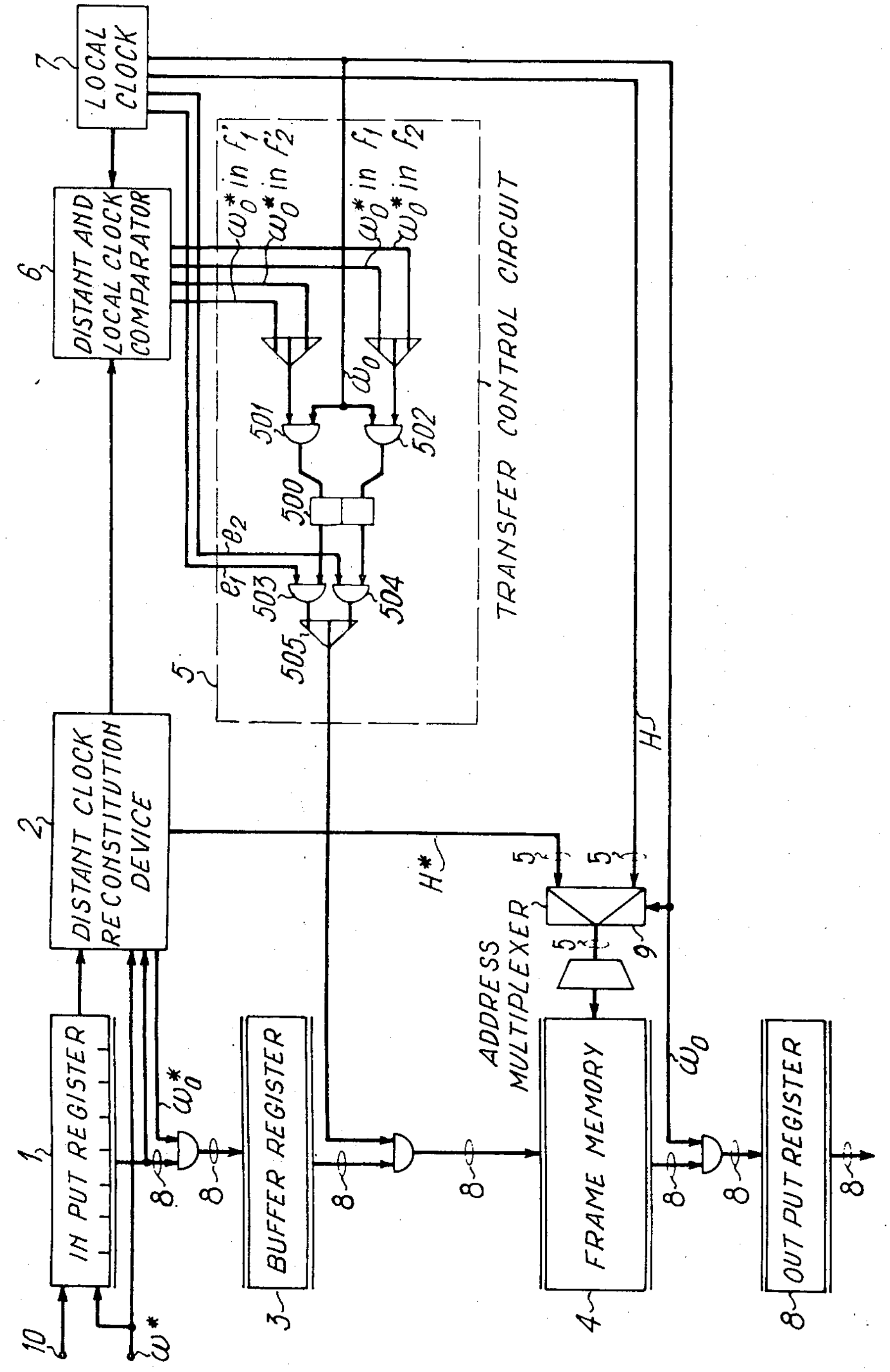
FIG. 1 shows a synchronization device of digital multiplex pulse code modulation signals according to the prior art.

Referring to FIG. 1, an incoming serial multiplex signal E is applied to input terminal 10 and enters an input shift register 1 at a rate $\omega^*$ given by the distant clock. A flywheel type device 2 which is not disclosed since it is known in the prior art allows the slot timing and the bit timing of the incoming signal to be reconstituted from the distant rate $\omega^*$ and the frame locking signal. This device includes a counter which is controlled by the timing pulses at the rate $\omega^*$ and by the frame locking signals contained in time slots $t_0$ of the frames of the incoming serial multiplex signal.

When shift register 1 has finished receiving an octet, that contained in time slot $t_i$ for example, this octet is transferred within buffer register 3. This transfer occurs at time $\omega_0^*$ and at the rate of the distant clock. At each local time slot and within said time slot at an instant which will be defined hereinafter, the octet within buffer register 3 is transferred into frame memory 4 which has a capacity of 32 words of 8 bits each. The transfer instant is selected by a transfer control circuit 5 from signals provided by a phase comparator 6 comparing the distant timing pulses and the local timing pulses respectively generated by fly-wheel device 2 and local clock 7. The five bit address of the time slot the contents of which are contained in buffer register 3 is furnished to frame memory 4 by the distant clock reconstitution device 2. This address is designated by H*.

At each local time slot, the frame memory 4 is read at an address equal to the number of this time slot and its contents are transferred into the output register 8, at the outlet of which is found therefore the synchronized multiplex signal.

The writing in buffer register 3 is controlled by the distant clock reconstitution device whilst its reading-out is controlled by the local clock. These two clocks shift one in respect of the other. It is therefore necessary to avoid the reading and the writing of the buffer register 3 being made simultaneously, which would be a cause of errors. For that, it is known to arrange two reading times for 3 (writing times for 4) per time slot which will be called $e_1$ and $e_2$ and which are located respectively (see the line *a* of FIG. 2) in the bit time intervals $\omega_2$ and $\omega_6$ and to define four windows $f_1, f_2, f_1', f_2'$ the function of which comply with the following rule:

a. When a pulse $\omega_o^*$ connected with the incoming frame coincides with $f_1$ or $f_2$, the instant of reading of 3 is $e_2$ and when $\omega_o^*$ coincides with $f_2'$ or $f_1'$, the instant of reading of 3 is $e_1$. Instead of referring to the reading instants of buffer register 3, one will refer to the writing instants of frame memory 4 which are the same. When the desired writing instant is not the writing instant used, the writing instant must be switched. Several cases may then be presented.

The distant clock is slower than the local clock

Figure 2:
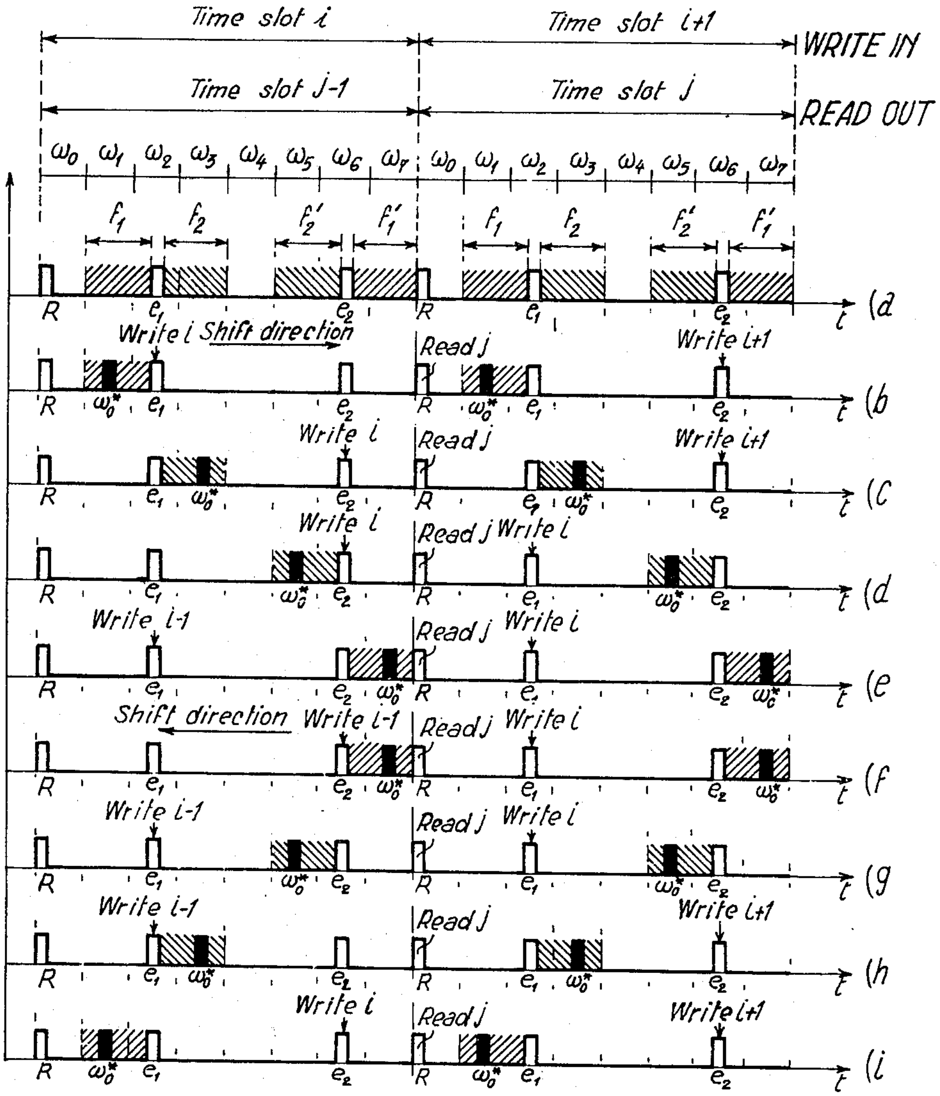
FIG. 2 is a diagram of pulses for the explanation of the jumps of octets (omissions and duplications) due to the time shift between the distant and local clocks.

One will now pass successively to the following cases which are designated by a reference letter which is the same as that of the line of FIG. 2 showing the corresponding case. b. $\omega_o^*$ following the direction of the time shift enters the window $f_1$ whilst the writing time $e_1$ is utilised. At the next time slot, $e_2$ will be used as writing time. Thereby, nothing will be disturbed. c. $\omega_o^*$ is in the window $f_2$. As $e_2$ is utilised, there is no reason to change the instant of writing in the frame memory. d. The shift going increased, $\omega_o^*$ penetrates into the window $f_2'$. During the next time slot $e_1$ will be used as instant of writing. It can be seen in the diagram of line *d* of FIG. 2 that one writes then twice subsequently the word of the considered time slot in the frame memory. Thus writing in the frame memory has been duplicated. In itself, this doubling is not troublesome. On the contrary, it is accompanied by a displacing of the sequences of writing and reading in the frame memory. In fact, in the time slot preceding the duplication, the channel i is written then the channel $j$ is read. In the time slot following the duplication, the channel $i$ is written then the channel $(j+1)$ is read. If $i \neq j$ this displacement has no effect. On the other hand, if $i = j$, which occurs one time out of 32 (since $i$ and $j$ are between 0 and 31), the displacement of the writing and reading instants will be accompanied with a doubling, in leaving the frame memory, of all the channels. In effect, before the instant of writing is changed, the channels were written in the frame memory just before their reading. After the change of writing instant, the channels will be written just after their reading. For the 32 channels written before the change of writing instant, a second reading will be made before modifying the contents of the memory. For all these channels, the same octet will therefore be transmitted twice consecutively. There is a frame jump by doubling the reading. e. The shift continuing, $\omega_o$* enters into the window $f_1'$ and $e_1$ is the instant of writing utilised. Nothing is changed. Then the shift continues and $\omega_o$* enters into the window $f_1$ whilst $e_1$ is utilised. This is case *b*. It is seen that the cycle re-commences.

The distant clock is quicker than the local clock

Similar cases will be found which will be described one after the other. f. $\omega_o$* is in $f_1'$ and $e_2$ is used. $e_1$ is selected and there is no disturbance. g. $\omega_o$* is in $f_2'$ and $e_1$ is utilised. There is no change to be effected. h. $\omega_o$* is in $f_2$ and $e_1$ is utilised. It is then necessary to select $e_2$. It will be seen in the corresponding diagram (FIG. 2, line *h*) that the channel *i* will not have been written in the frame memory. This is the jump in writing by omission, similar to the jump in writing by duplication referred to above. Contrary to that which happens for the octet duplication, the octet omission in writing has always repercussion in reading. In fact, an information which has now been written in the frame memory cannot be read therefrom. This jump in writing by omission only concerns one channel, the channel *i*.

As in case *d*, the jump in writing causes a displacement of the cycles of reading and writing in the frame memory. This displacement is made in the opposite direction to that of the case *d*. Furthermore, if $i=j$, that is to say once out of 32 times, this displacement will cause for the 32 channels a frame jump by the omission of the reading. In effect, for each channel, there will be two writings of different octets between two readings. The first octet written in is then lost. i. The shift continues and $\omega_o$* enters the window $f_1$. As $e_2$ is utilised, there is no action to be undertaken.

Then, the shift continuing, $\omega_o$* is in the window $f_1$ and $e_1$ is utilised. It is the case *f* and the cycle re-commences.

The transfer control circuit 5 of FIG. 1 comprises according to the prior art, two AND gates 501 and 501 both receiving from the local clock and time base 7, the signal $\omega_o$ and respectively from the phase comparator 6, a signal produced by the said comparator when the clock impulse $\omega_o$* is in one of the windows $f_1$ or $f_2$ and a signal produced by the said comparator when the clock impulse $\omega_o$* is in one of the windows $f_1'$ or $f_2'$.

The outlet signals of the AND gates 501 and 502 control a flipflop 500 the states 1 and 0 of which control two AND gates 503 and 504 receiving respectively from the local clock the signals $e_1$ and $e_2$. The outlet signals of the AND gates 503 and 504 are applied to the inputs of the OR gate 505, the output signal of which controls the AND gates of transfer from the buffer register 3 to the frame memory 4.

Summing up, the investigation which has just been done has permitted of distinguishing two phenomena. The writing jump is produced when the instant of writing is switched and $\omega_o$* is in the window $f_2$ or $f_2'$. This writing jump only concerns a single channel. A reading jump is produced under the same condition as the writing jump but once out of 32 times, it concerns the 32 time slots of a same frame. The reading jump introduces always a loss or a doubling of information. The writing jump is not troublesome when it concerns a doubling. It introduces a loss of information when it concerns an omission.

The continuation of the explanation will show how the jump in writing is eliminated.

Figure 3:
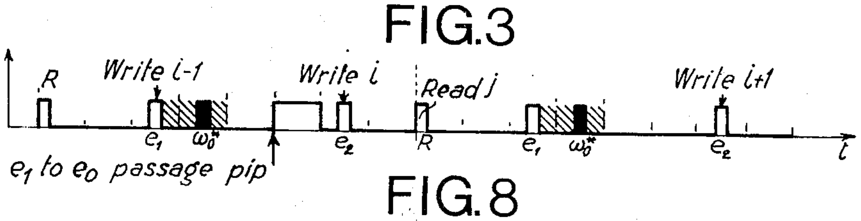
FIG. 3 is a diagram of pulses for the explanation of the selection of the switching instant between the two instants of transfer.

The system according to the invention permits of eliminating the writing jumps in the following manner. If one takes again the diagram of line *b* of FIG. 2, examined above, it is found that the entry of $\omega_o$* in the window $f_2$ has the consequence of changing the writing instant from $e_1$ to $e_2$. This switching is only effective in reality in $\omega_o$ of the following time slot with the drawback already noted of the writing jump. This inconvenience is obviated by effecting the switching of writing instant from $e_1$ to $e_2$ no longer during the bit time interval $\omega_o$ of the following time slot, but in the actual time slot and during bit time interval $\omega_5$ of this time slot according to the diagram of FIG. 3. The writing jump is thus avoided and channel i is effectively written in the frame memory.

Figure 4:
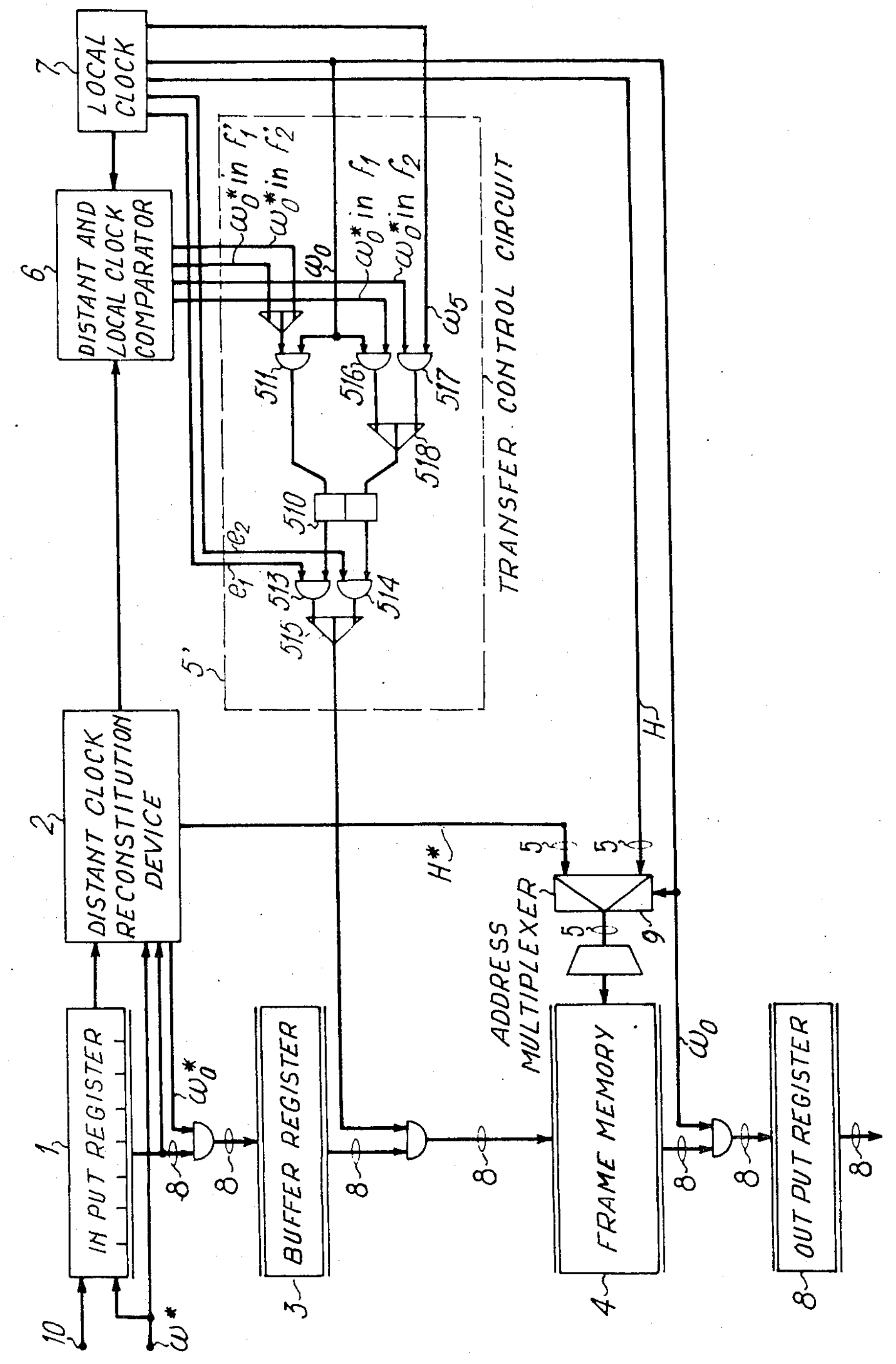
FIG. 4 shows a synchronization device of digital multiplex pulse code modulation signals according to the first feature of the invention.

FIG. 4 shows the new transfer control circuit 5'. The AND gates 511, 513, 514, the OR gate 515 and the flipflop 510 are respectively identical to the AND gates 501, 503, 504, the OR gate 505 and flipflop 500. The AND gate 502 is replaced by an assembly formed by the AND gates 516 and 517 and the OR gate 518. The AND gate 516 receives the clock pulse $\omega_o$ and a signal produced when the clock pulse $\omega_o$* is in the window $f_1$. The AND gate 517 receives the clock pulse $\omega_5$ and a signal produced when the clock pulse $\omega_o$* is in the window $f_2$. It will be seen that the passage from $e_1$ to $e_2$ is made during $\omega_o$ if $\omega_o$* is in the window $f_1$ and during $\omega_5$ if $\omega_o$* is in the window $f_2$.

Figure 5:
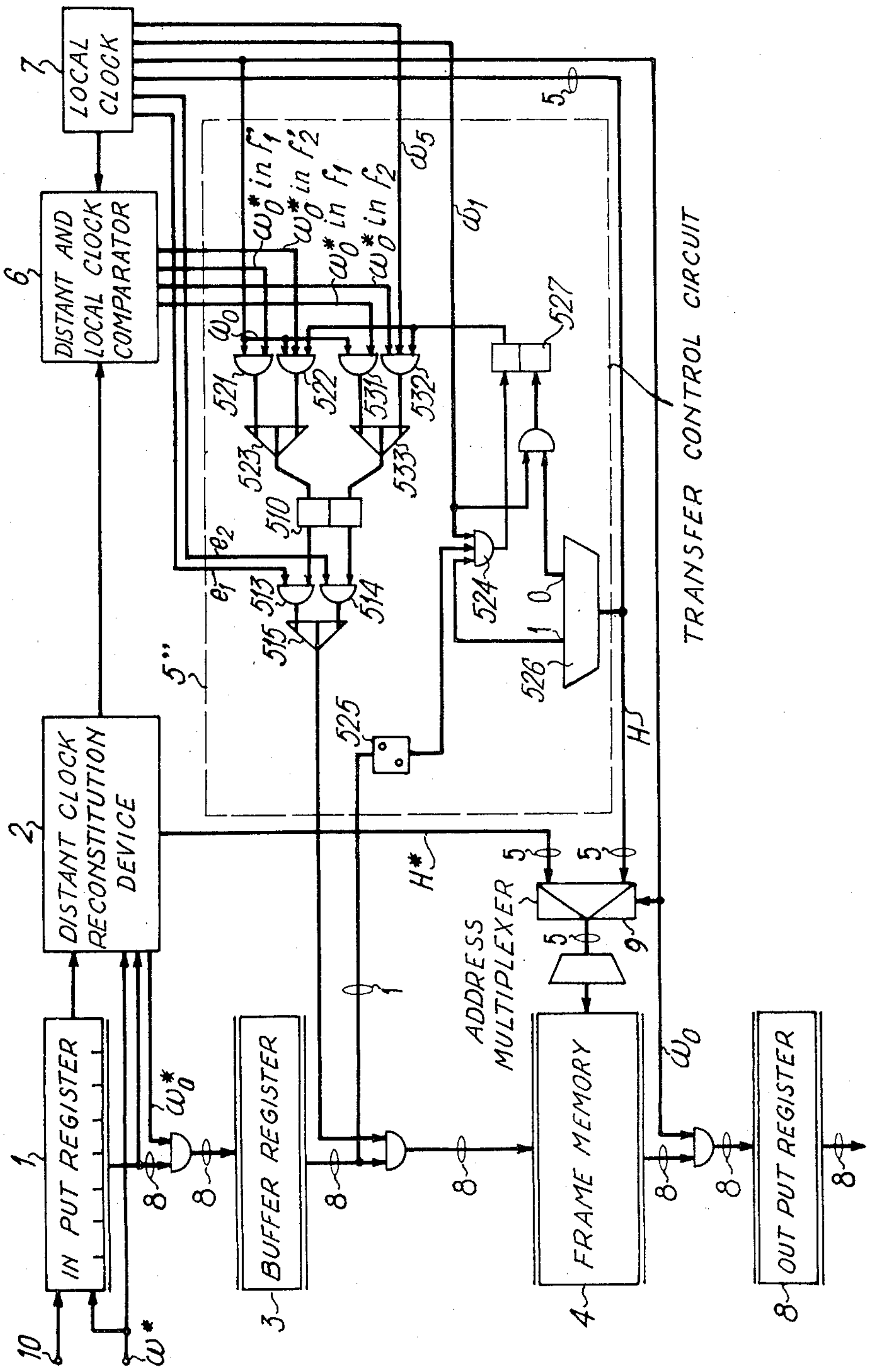
FIG. 5 shows a synchronization device of digital multiplex pulse code modulation signals according to the first and second features of the invention.

In examining the diagram of line *h* of FIG. 2, illustrating the case of the writing jump by omission, it is found that this jump is produced when $\omega_o$* enters in the window $f_2$ and that the instant of writing $e_1$ is switched to the instant of writing $e_2$. Now so long that $\omega_0$* does not enter window $f_2'$, one can defer without inconvenience the change of instant of writing. The moment when the switching of writing instant is produced is selected such that this is a stuffing octet which subjects it for one channel and one only, for example the channel 1. Now it is easy to recognize whether the last octet written in the buffer register, and which must be subject to the writing jump by omission, is a stuffing octet. The stuffing octets differ from the informative octets by a particular feature, for example according to the binary value of the bit of higher weight. FIG. 5 gives the diagram of the device used to effect the preceding switching. There will be found there the components of FIGS. 1 and 4 namely the registers 1, 3, 8 and the frame memory 4. The transfer control circuit however is a circuit 5'' different from the circuits 5 and 5'. It has the AND gates 513 and 514, the OR gate 515 and the flipflip 510.

The AND gate 511 of FIG. 4 is replaced by the two AND gates 521 and 522 and the OR gate 523, and the AND gates 516 and 517 are replaced by the two AND gates 531 and 532 and the OR gate 533. The gate 521 receives the signals $\omega_o$ and $\omega_o$* in $f_1'$. The gate 522 receives the signals $\omega_o$ and $\omega_o$* in $f_2'$ as well as a third signal of which mention will be made. The gate 531 receives the signals $\omega_o$ and $\omega_o$* in $f_1$. The gate 532 receives the signals $\omega_5$ and $\omega_0{}^*$ in $f_2$ as well as the said third signal.

One of the eight wires connecting the buffer register 3 to the frame memory 4, the one transmitting the bits of higher weight is connected to AND gate 524 through an inverter 525. The AND gate 524 receives likewise the clock pulse $\omega_1$ and the signal appearing on output terminal 1 of the address decoder 526. There results therefrom that the AND gate 524 is open when there is a stuffing octet in the channel 1. The outlet signal of the AND gate 524 puts into the state 1 the flipflop 527 and this flipflop is preset to the zero state by the signal appearing on the outlet O of the decoder 526. The flipflop 527 produces the above mentioned third signal which is applied to the AND gates 522 and 532. It will be seen that the switching of writing instant is effected under the same conditions as in FIG. 3 with, in addition, the condition that it is a stuffing octet which undergoes the writing jump by omission.

In the previously described system, the interchange of the reading and writing cycles produces once in 32 a jump of the whole frame. This jump may be easily interpreted in FIG. 6a where the writing and reading cycles are shown by two rules, the writing rule (W) and the reading rule (R) graduated from 0 to 31. The rules (W) and (R) may be displaced relative to one another.

The graduations of (W) represent the numbers of the channels whose octets are written in the frame memory and the graduations of (R) represent the numbers of the channels whose octets are read in the frame memory. In the example of FIG. 6*a*, the graduation 13 of (W) is above the graduation 6 of (R). This means that in the same time slot, the channel 13 is written in the frame memory and the channel 6 is read.

The displacement of (W) relative to (R) corresponds to the shiftings of the writing instants. (W) is displaced to the right when the distant clock is slower than the local clock and towards the left in the opposite case. If the graduations of the same value of (W) and (R) are located one above the other (FIG. 6*b*), a shifting of writing instant (whatever its direction) will cause the jump of the 32 channels. The case of FIG. 6*b* is only produced once out of 32.

Without changing the graduation of the writing rule, there will be taken for the reading rule the following graduation.

(R) . . . . 0 2 4 6 8 10 12 14 16 18 20 22 24 26 28 30 1 3 5 7 9 11 13 15 17 19 21 23 25 27 29 31 . . . .

Then according to the respective positions of (W) and (R), three cases may be presented.

No graduation appears in coincidence on the two rules. This is the case of FIG. 6*c*.

The graduation 0 and graduation 31 coincide simultaneously on the two rules. That is the case of FIG. 6*d*.

In all the other cases, there is a graduation, and one only, which coincides on the two rules. For example, in the case of FIG. 6*e*, it is the number 29.

According to the present invention, this arrangement is applied to the system of re-synchronization. Up till now, the reading cycle of the frame memory has been the following:

At the commencement of time slot $t_0$, the channel O is read.

At the commencement of time slot $t_1$, the channel 1 is read.

At the commencement of time slot $t_{31}$, the channel 31 is read.

The new reading cycle corresponds to the graduation of the reading rule in the example which has just been described.

At the commencement of time slot $t_0$, the channel 0 is read.

At the commencement of time slot $t_1$, the channel 2 is read.

At the commencement of time slot $t_{15}$, the channel 30 is read.

At the commencement of time slot $t_{16}$, the channel 1 is read.

At the commencement of time slot $t_{30}$, the channel 29 is read.

At the commencement of time slot $t_{31}$, the channel 31 is read.

The control of such a reading sequence is very simple to effect. The local time base 7 provides the numbers of the time slots H in the form of five bit address words H0, H1, H2, H3, H4 where H4 is the higher weight bit. If there is supplied to the frame memory the binary address H4, H0, H1, H2, H3, where H3 is the higher weight bit, it can be seen that this address is indeed that searched which corresponds to the sequence:

0, 2, 4, 6, 8, 10, 12, 14, 16, 18, 20, 22, 24, 26, 28, 30, 1, 3, 5, 7, 9, 11, 13, 15, 17, 19, 21, 23, 25, 27, 29, 31.

It suffices therefore to operate (FIG. 7) on the five bits giving the number of the time interval a circular permutation.

Figure 7:
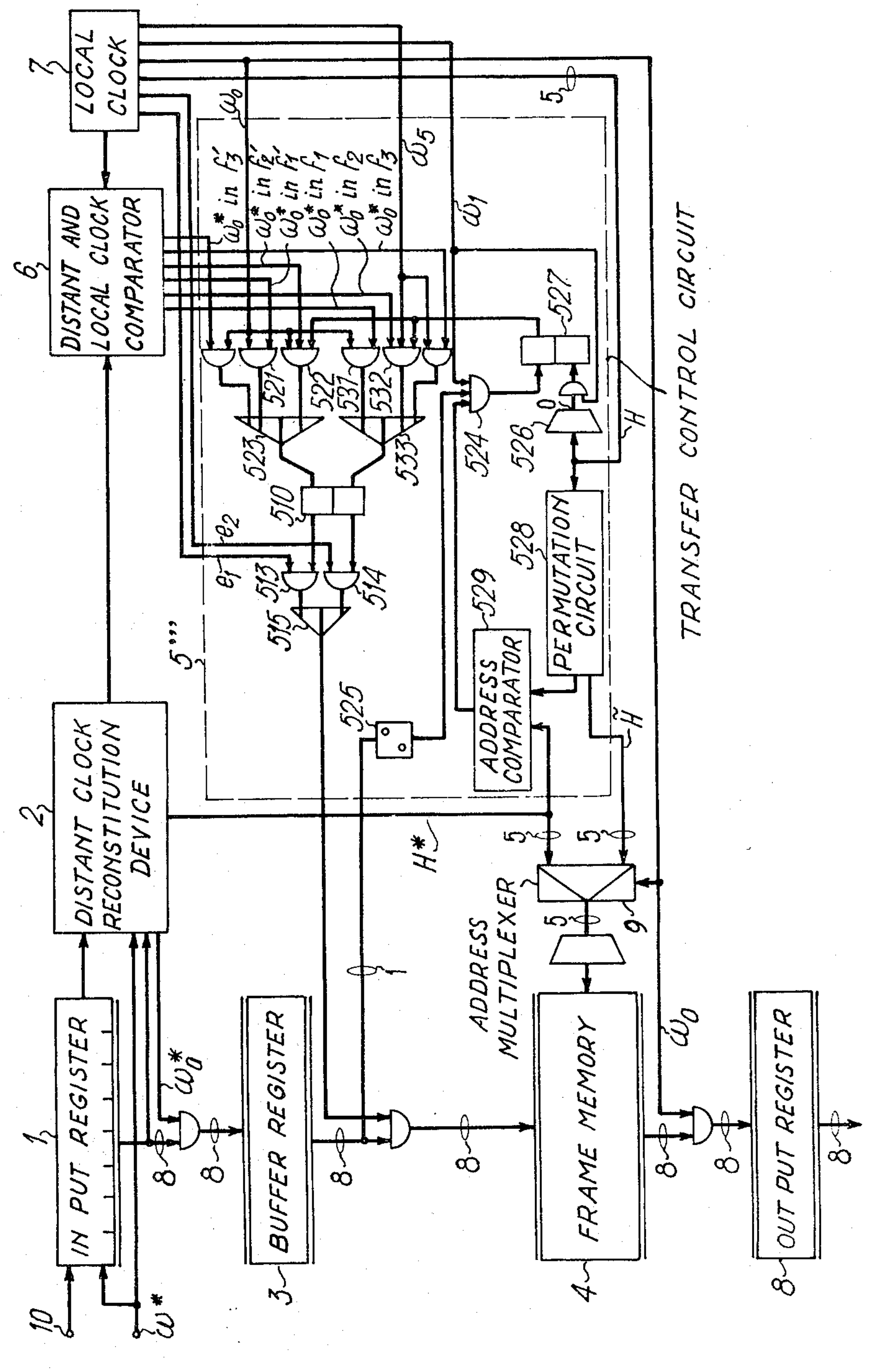
FIG. 7 shows a synchronization device of digital multiplex pulse code modulation signals according to the first, second and third features of the invention.

The system of FIG. 7 permits of operating a re-synchronization of the whole incoming multiplex PCM signal in which the 31 multiplexed data channels undergo time slot jumps only on stuffing octets. There will be found, as in the preceding systems, the input register 1, the buffer register 3, the frame memory 4, the output register 8, and the address multiplexer 9 of the frame memory 4. The transfer control circuit 5''' differs from the circuit 5'' of FIG. 5 in that the address H = H0 H1 H2 H3 H4 is subjected to a permutation in permutation circuit 528 to become the "permutated" address H = H4 H0 H1 H2 H3.

Figure 6:
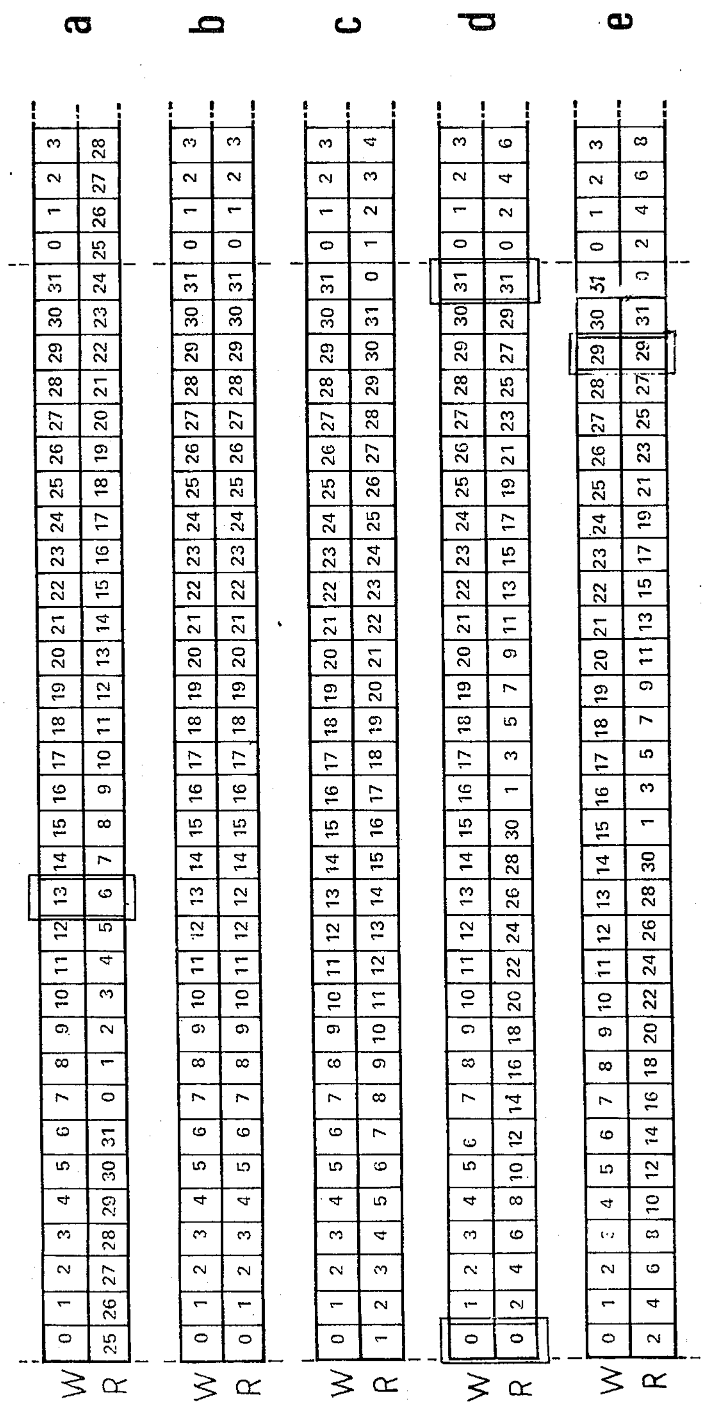
FIG. 6 is a diagram showing, in the form of two closed series, the writing addresses and the reading addresses of the frame memory.

It has been seen with regard to FIG. 6, that the channel which is subjected to the time slot jump is characterized by the fact that the reading address and the writing address coincide.

This is expressed by the condition H = H*. The comparison of the addresses H and H* is effected in address comparator 529, the outlet of which is connected to AND gate 524. The reset of flip-flop 527 is effected as in the case of FIG. 5.

From the preceding, the consequences of a shifting of the writing instant may be a. the jump of a single channel;

b. the jump of channel 31 and of channel 0.

Channel 0 not containing information to be transmitted, its jump is not troublesome.

c. No channel jump.

If the channel which is subjected to the jump contains a stuffing octet, the flipflop 527, by means of the gate 524, is put to 1 in $\omega_1$ since AND gate 524 receives timing pulse $\omega_1$. It then permits of effecting the change of writing instant which will cause the jump, immediately below, that is in $\omega_5$ (through gate 532) or in $\omega_0$ (through gate 522). Flipflop 527 is reset at $\omega_1$ if H = 0. This permits of preventing that the presence of a stuffing octet in channel 0 causes a jump when it is the turn of channels 0 and 31 to jump. If this precaution were not taken, there would result disturbances in channel 31.

Figure 8:
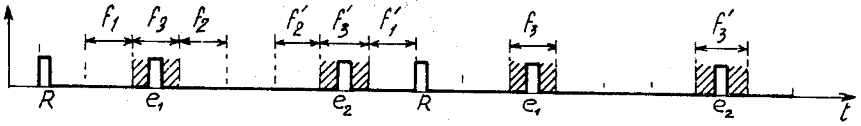
FIG. 8 is an explanatory diagram of the synchronization device of FIG. 7.

Finally, there is a case in which no channel is subjected to a jump. To avoid $\omega_0$* coinciding with the writing instant in the frame memory, two additional windows or guard windows $f_3$ and $f_3'$ according to FIG. 8 are provided. If $\omega_0$* enters these windows, the jump will be effected independently of state of flipflop 527. The jump is then produced for a single channel.

What I claim is:

1. A device for synchronization of a digital time-multiplexed signal comprising time slots containing pulse code modulation signals respectively assigned to transmission channels, and multiplexed in frames, the frames and time slots of the incoming signal to said synchronization device being defined by a distant clock and the frames and time slots of the outgoing signal from said synchronization device being defined by a local clock, said synchronization device comprising an input register, a buffer register connected to said input register, a frame memory connected to said buffer register and an output register connected to said frame memory, means for defining a distant clock timing pulse having a fixed position relative to the incoming signal frame, means for defining a first and a second local clock timing pulses having a fixed position relative to the outgoing signal frame and a first and a second time windows overlapping said two local clock timing pulses, means for receiving the pulse code modulation signals in said input register and for storing these signals in said buffer register, means for writing the code modulation signals stored in the buffer register, at a writing instant, in the frame memory, means for recurrently reading the code modulation signals written in the frame memory, means for detecting, in each outgoing signal time slot, the coincidence of the distant clock timing pulse with the first and the second time windows and thereby respectively selecting as writing instant, the second and the first local clock timing pulse, means for switching the writing instant from the first to the second local clock timing pulse at switching instants and means for selecting as said switching instants, instants located in the time slot following the time slot during which the coincidence has been detected when the two writing instants to be switched to one another are in different time slots and instants located in the very time slot during which the coincidence has been detected and in said time slot between the first and second local clock timing pulses when the two writing instants to be switched to one another are in the same time slot.

2. A device for synchronization of a digital time-multiplexed signal comprising time slots respectively assigned to transmission channels and containing significative pulse code modulation signals and stuffing signals, said time slots being multiplexed in frames, the frames and time slots of the incoming signal to said synchronization device being defined by a distant clock and the frames and time slots of the outgoing signal from said synchronization device being defined by a local clock, said synchronization device comprising the input register, a buffer register connected to said input register, a frame memory connected to said buffer register and an output register connected to said frame memory, means for defining a distant clock timing pulse having a fixed position relative to the incoming signal frame, means for defining a first and a second local clock timing pulses having a fixed position relative to the outgoing signal frame and a first and a second time windows overlapping said two local clock timing pulses, means for receiving the pulse code modulation signals in said input register and for storing these signals in said buffer register, means for writing the code modulation signals stored in the buffer register, at a writing instant, in the frame memory, means for recurrently reading the code modulation signals written in the frame memory, means for detecting, in each outgoing signal time slot, the coincidence of the distant clock timing pulse with the first and the second time windows and thereby respectively selecting as writing instant the second and the first local clock timing pulses, means for switching the writing instant from the first to the second local clock timing pulse at switching instants, means for distinguishing the time slots containing significative pulse code modulation signals from stuffing signals and means controlled by said detecting means and said distinguishing means for selecting as said switching instants, instants located in a stuffing signal containing time slot following the time slot during which the coincidence has been detected when the two writing instants to be switched to one another are in different time slots and instants located in a stuffing signal containing time slot during which the coincidence has been detected, and in said time slot between the first and second local clock timing pulses, when the two writing instants to be switched to one another are in the same time slot.

3. A device for synchronization of a digital signal comprising time slots containing pulse code modulation signals respectively assigned to transmission channels and time multiplexed in frames, the time slots being defined by addresses from 0 to (2N+1) in said frames, the frames and time slots of the incoming signal to said synchronization device being defined by a distant clock and the frames an times slots of the outgoing signal from said synchronization device being defined by a local clock, said synchronization device comprising a input register, a buffer register connected to said input register, a frame memory connected to said buffer register and an output register connected to said frame memory, means for defining a distant clock timing pulse having a fixed position relative to the incoming signal frame, means for defining a first and a second local clock timing pulses having a fixed position relative to the outgoing signal frame and a first and a second time windows overlapping said two local clock timing pulses, means for receiving the pulse code modulation signals contained in the time slots in said input register and for storing these signals in said buffer register, means for successively writing the code modulation signals contained in time slots 0, 1, 2, 3, . . . (2N+1) at writing instants in the frame memory, means for recurrently reading in the frame memory the code modulation signals contained in time slots 0, 2, 4, . . . , 2N, 1, 3, 5, . . . (2N+1), means for detecting, in each outgoing signal time slot, the coincidence of the distant clock timing pulse with the first and the second time windows and thereby respectively selecting as writing instants the second and the first local clock timing pulses, means for switching the writing instant from the first to the second local clock timing pulses at switching instants and means for selecting as said switching instants, instants located in the time slot following the time slot during which the coincidence has been detected when the two writing instants to be switched to one another are in different time slots and instants located in the very time slot during which the coincidence has been detected and in said time slot between the first and second local clock timing pulses when the two writing instants to be switched to one another are in the same time slot.

* * * * *